United States Patent
Nguyen

(10) Patent No.: US 10,597,945 B2
(45) Date of Patent: Mar. 24, 2020

(54) COILED-TUBING FLUID-LUBRICANT COMPOSITION AND RELATED METHODS

(71) Applicant: Dover Chemical Corporation, Dover, OH (US)

(72) Inventor: Duong Nguyen, Dover, OH (US)

(73) Assignee: Dover Chemical Corporation, Dover, OH (US)

( * ) Notice: Subject to any disclaimer, the term of this patent is extended or adjusted under 35 U.S.C. 154(b) by 0 days.

(21) Appl. No.: 15/429,803

(22) Filed: Feb. 10, 2017

(65) Prior Publication Data

US 2017/0233634 A1    Aug. 17, 2017

Related U.S. Application Data

(60) Provisional application No. 62/294,564, filed on Feb. 12, 2016.

(51) Int. Cl.
- C09K 8/035 (2006.01)
- E21B 7/20 (2006.01)

(52) U.S. Cl.
CPC ............. E21B 7/20 (2013.01); C09K 8/035 (2013.01); C09K 2208/28 (2013.01); C09K 2208/34 (2013.01)

(58) Field of Classification Search
CPC ...... C09K 2208/34; C09K 8/035; C09K 8/52; C09K 8/12; C09K 2208/28; C09K 2208/12; C09K 8/24; C09K 8/04; C09K 8/32; C09K 8/528; E21B 43/16; E21B 7/20; E21B 43/34; E21B 43/38; E21B 43/26; E21B 43/40; E21B 43/36
See application file for complete search history.

(56) References Cited

U.S. PATENT DOCUMENTS

| | | | |
|---|---|---|---|
| 3,994,350 A | 11/1976 | Smith et al. | |
| 4,517,100 A * | 5/1985 | Nance | C09K 8/04 507/103 |
| 5,291,956 A | 3/1994 | Mueller et al. | |
| 5,700,767 A | 12/1997 | Adams | |
| 6,849,581 B1 * | 2/2005 | Thompson | C11D 3/2075 507/103 |
| 7,635,667 B1 * | 12/2009 | Brazzel | C09K 8/035 507/134 |
| 9,500,058 B2 | 11/2016 | Tunc et al. | |
| 2011/0232970 A1 | 9/2011 | Miller et al. | |
| 2012/0220501 A1 * | 8/2012 | Mason | C09K 8/36 507/133 |
| 2015/0007995 A1 * | 1/2015 | Livescu | E21B 21/00 166/305.1 |
| 2015/0218433 A1 * | 8/2015 | Nguyen | C09K 8/035 175/65 |
| 2016/0002521 A1 * | 1/2016 | Dillon | C09K 8/06 507/101 |
| 2016/0069173 A1 | 3/2016 | Castro et al. | |

FOREIGN PATENT DOCUMENTS

| | | | |
|---|---|---|---|
| CN | 101633197 | * | 4/2011 |
| WO | WO2012134953 A1 | | 10/2012 |
| WO | WO2016/019216 | * | 2/2016 |
| WO | WO2016019216 A1 | | 2/2016 |

OTHER PUBLICATIONS http://www.chemistryexplained.com/Di-Fa/Fats-and-Fatty-Acids.html downloaded Jul. 18, 2019.*
Greiner et al. Chemical Economics Handbook Linear alpha-Olefins, 2010.*
International Search Report and Written Opinion of the International Searching Authority for corresponding PCT application No. PCT/US2017/017406.
Abstract of: Silviu Livescu, Steven Craig, and Thomas Watkins; Challenging the Industry's Understanding of the Mechanical Friction Reduction for Coiled Tubing Operations; Society of Petroleum Engineers, Oct. 2014.
Abderrahmane Boumali, Mark E. Brady, Erik Ferdiansyah, Santhana Kumar, Stan Van Gisbergen, Tom Kavanagh, Avel Z. Ortiz, Richard A. Ortiz, Arun Pandey, Doug Pipchuk, Stuart Wilson; Coiled Tubing: Innovative Rigless Interventions; Oilfield Review, vol. 17, Issue 4; Dec. 2005.
David Bigio, Andy Rike, Axel Christensen, Jim Collins, Denish Doremus, Glen Glass, Patrick Tracy, Niels Bo Joergensen, Douglas Stephens; Coiled Tubing Takes Center Stage; Oilfield Review, vol. 6, Oct. 1994.
Wang Xiaojun, Yo Jing, Sun Yunchoa, Yang Chao, Jiang Lizhou, Liu Chang; A solids-free brine drilling fluid system for coiled tubing drilling; Petroleum Exploration and Development; vol. 45, Issue 3, Jun. 2018.

* cited by examiner

*Primary Examiner* — Kumar R Bhushan
(74) *Attorney, Agent, or Firm* — Black, McCuskey, Souers & Arbaugh, LPA

(57) ABSTRACT

A method for performing a coiled-tubing process, the method having the steps: performing a coiled-tubing process using a fluid-lubricant composition that includes a sulfur-containing compound, and introducing the fluid-lubricant composition into a subterranean wellbore casing.

4 Claims, No Drawings

COILED-TUBING FLUID-LUBRICANT COMPOSITION AND RELATED METHODS

CROSS-REFERENCE TO RELATED APPLICATIONS

This patent application claims priority to provisional patent application Ser. No. 62/294,564 filed on Feb. 12, 2016 and titled, "High-Sulfur Sulfurized Olefins and Fatty Esters as Lubricants For Coiled-Tubing (CT) Subterranean Drilling of Oil-Gas Exploration." All of the subject matter in the provisional patent application is hereby incorporated by reference into this application.

BACKGROUND OF THE INVENTION

The use of lubricants in coiled-tubing processes is well known, and a non-limiting example of a known coiled-tubing process that employs a lubricant within the wellbore casing is coiled-tubing drilling for subterranean oil-and-gas exploration.

BRIEF SUMMARY OF THE INVENTION

A method for performing a coiled-tubing process, the method having the steps: performing a coiled-tubing process using a fluid-lubricant composition that includes a sulfur-containing compound, and introducing the fluid-lubricant composition into a subterranean wellbore casing.

A method for performing a coiled-tubing process, the method having the steps: performing a coiled-tubing process using a fluid-lubricant composition that includes a sulfur-containing compound selected from the group consisting of sulfurized (10% S) canola-based methyl esters, sulfurized (15% S) canola-based methyl esters, sulfurized (22% S) C9 olefins, sulfurized (35% S) C9 olefins, sulfurized (20%) C10 olefins, sulfurized (38%) C10 olefins, sulfurized (18% S) C12 olefins, sulfurized (28% S) C12 olefins, sulfurized (16% S) C14 olefins, sulfurized (25% S) C14 olefins, sulfurized (20%) C16 olefins, sulfurized (32%) C16 olefins, sulfurized (12% S) C18 olefins, and sulfurized (20% S) C18 olefins; and introducing the fluid-lubricant composition into a subterranean wellbore casing.

A method for performing a coiled-tubing process, the method having the steps: performing a coiled-tubing process using a fluid-lubricant composition that includes: a sulfur-containing compound that is the product of a process that reacts sulfur with an olefin or fatty ester; and an emulsifier; and introducing the fluid-lubricant composition into a subterranean wellbore casing.

Embodiments are generally directed to coiled-tubing fluid-lubricant compositions and related methods. Using the fluid-lubricant-composition embodiments in coiled-tubing applications causes improved coiled-tubing-process field performance relative to coiled-tubing methods that use known coiled-tubing lubricants. Using the coiled-tubing fluid-lubricant-composition embodiments enable coiled tubing to travel greater distances within a wellbore casing relative to the distances that can currently be reached by using known coiled-tubing lubricants. Use of the fluid-lubricant-composition embodiments allow coiled tubing to travel distances within a wellbore casing that are 50 to 110% farther than the distances that can be reached by using known coiled-tubing lubricants. Coiled-tubing fluid-lubricant-composition embodiments enable coiled tubing to reach distances within the wellbore casing ranging from 10,000 feet to 25,000 feet. The relatively farther coiled-tubing distances that can be achieved because of the fluid-lubricant-composition embodiments are at least in part believed to be due to the increased friction reduction (relative to the friction reduction of known coiled-tubing lubricants) between a wellbore-casing interior wall and the coiled tubing.

Compared to known coiled-tubing lubricants, the coiled-tubing fluid-lubricant-composition embodiments are 50 to 100% more effective in reducing friction generated by sliding steel against steel surfaces. The coiled-tubing fluid-lubricant-composition embodiments generate friction reductions ranging from 40 to 55% or more compared to 20 to 25% obtained from the current commercial lubricants or additives.

DETAILED DESCRIPTION OF THE INVENTION

Coiled-tubing fluid-lubricant embodiments are directed to sulfur-containing compositions and their use as lubricants in coiled-tubing methods.

Embodiments are directed to fluid-lubricant compositions that include a sulfur-containing or sulfurized compound. Useful sulfur-containing compounds include compounds having carbon-chain lengths ranging from C8 to C20. In embodiments, useful sulfur-containing compounds have carbon-chain lengths that are C8, C10, C12, C14, C16, C18, or C20. In embodiments, useful sulfur-containing compounds have carbon-chain lengths that are C10, C12, C14, or C16. In embodiments, the sulfur-containing compound has a carbon-chain length of C8. In embodiments, the sulfur-containing compound has a carbon-chain length of C10. In embodiments, the sulfur-containing compound has a carbon-chain length of C12. In embodiments, the sulfur-containing compound has a carbon-chain length of C14. In embodiments, the sulfur-containing compound has a carbon-chain length of C16. In embodiments, the sulfur-containing compound has a carbon-chain length of C18. In embodiments, the sulfur-containing compound has a carbon-chain length of C20.

In embodiments, a useful sulfur-containing compound is the reaction product of a process that reacts either: i) sulfur and an olefin, or ii) sulfur and a fatty ester. Useful olefin reactants include both alpha and non-alpha olefins; wherein alpha can be understood to have its common meaning that a double bond is located in the primary position. In other embodiments, useful olefin reactants are internal or branched olefins. Useful fatty-ester reactants include oleates and linoleates. Additional useful fatty-ester reactants include soybean oil, soybean-based methyl esters, canola oil, canola-based methyl esters, triglyceride, animal fats, and lard oils. In embodiments, the fatty-ester reactant is a canola-based methyl ester. In embodiments, the fatty-ester reactant is a soy-based methyl ester.

In embodiments, the sulfur-containing compound has an amount of sulfur ranging from 10% to 50% by weight relative to the total weight of the compound. In other embodiments, the sulfur-containing compound has an amount of sulfur ranging from 10% to 35% by weight relative to the total weight of the compound.

Additional useful sulfur-containing compounds include: sulfurized (10% S) canola-based methyl esters, sulfurized (15% S) canola-based methyl esters, sulfurized (22% S) C9 olefins, sulfurized (35% S) C9 olefins, sulfurized (20%) C10 olefins, sulfurized (38%) C10 olefins, sulfurized (18% S) C12 olefins, sulfurized (28% S) C12 olefins, sulfurized (16% S) C14 olefins, sulfurized (25% S) C14 olefins, sulfurized (20%) C16 olefins, sulfurized (32%) C16 olefins, sulfurized (12% S) C18 olefins, and sulfurized (20% S) C18 olefins. In the immediately above list of sulfur-containing compounds, the "sulfurized (X %) CN compound classification" means that the compound(s) is X % sulfur by weight relative to the total weight of the compound and that the compound has a specific number of carbon atoms.

In another embodiment, a useful sulfur-containing compound is sulfurized alkyl succinic anhydride.

As mentioned above, the fluid-lubricant-composition embodiments include at least one sulfur-containing compound. In embodiments, the fluid-lubricant composition includes 1% to 10% by weight one-or-more sulfur-containing compounds, relative to the total weight of the fluid-lubricant composition. In other embodiments, the fluid-lubricant composition includes 1% to 2% by weight one-or-more sulfur-containing compounds, relative to the total weight of the fluid-lubricant composition.

Embodiments allow for any sulfur-containing compound taught herein to be used alone or in combination with any other sulfur-containing compound taught herein.

Additional fluid-lubricant-composition embodiments include both a sulfur-containing compound and an emulsifier. An emulsifier can be understood to have its ordinary meaning that is generally a compound or substance that stabilizes an emulsion by preventing liquids from separating. In embodiments, the emulsifier can be any known non-ionic emulsifier. In embodiments, useful emulsifiers include a polyethylene glycol, a polyethylene glycol ester, or combinations thereof. Useful amounts or weight percentages of emulsifier within the sulfur-containing fluid-lubricant can be determined by a person of ordinary skill in the art without having to exercise undue experimentation.

Non-limiting examples of useful sulfur-containing fluid-lubricant embodiments are presented below in the Examples section in Tables I and II.

EXAMPLES

TABLE I

List of Tested Coiled-Tubing Lubricants
COILED-TUBING (CT) LUBRICANTS

| | |
|---|---|
| Lubricant I: | Sulfurized (10% S) canola-based methyl esters |
| Lubricant II: | Sulfurized (15% S) canola-based methyl esters |
| Lubricant III: | Sulfurized (20% S) C-10 olefins |
| Lubricant IV: | Sulfurized (38% S) C-10 olefins |
| Lubricant V: | Sulfurized (20% S) C-16 olefins |
| Lubricant VI: | Sulfurized (32% S) C-16 olefins |

Canola-based methyl esters which primarily consist of methyl oleate (one double bond or one site of unsaturation) and methyl linoleate (two double bonds or two sites of unsaturation). These unsaturated fatty esters and relatively short-chained olefins were chosen to illustrate this new class of CT lubricants in order to have sufficient unsaturation sites on the chemical structures of the raw material(s) to be sulfurized or for sulfide linkages to be formed, especially at higher levels of sulfur percentage than 10-12% S which is typical for a non-active sulfurized additives. The higher-than-12% S renders a lubricant or additive much more reactive to a metal surface such as copper or steel to form a metallic sulfide coating which acts as a sacrificial go-between, an interlayer to separate two rubbing or sliding metallic surface resulting in less welding, deformation, and in the case of CT process, much less friction and drag. All sulfurized compounds were made by a conventional sulfurization process at around 160-185 C with flour sulfur and fatty esters or olefins with heating and exotherm.

TABLE II

General Coiled-Tubing Lubricant-Composition Formula Used in Table I

| | |
|---|---|
| Tap water | 350 g |
| Xanthan gum | 0.5 g |
| PAC or Poly anionic cellulose | 0.5 g |
| NaOH bead | 0.1 g |
| Polyethylene glycol (MW = 600) tallate esters | 0.65 g |
| NaCl or table salt | 12 g |
| Rev-Dust or calcium montmorillonite | 5.0 g |
| Sulfurized Compound(s) from Table I, i.e., Lubricant I, II, III, IV, V, or VI | 5.0 g |

Tap water might be replaced with brines of different concentrations of salts ranging from 1 to 20%; salts can be NaCl, KBr, KCl, etc. Xanthan gum and PAC or poly-anionic cellulose are water-dispersible thickeners which yield a gel strength and viscosities for the formulated fluid. These polymers were chosen instead of the conventional polyacrylic amides to exclude the minor known lubricating contribution coming from water-dispersible amides. Caustic beads are present to buffer the fluid to a basic level of pH greater than 7. Polyethylene glycol or PEG esters act as an emulsifier effective enough to disperse non-soluble or non-dispersible highly sulfurized lubricants in water or diluted brine mixtures. NaCl or other salts are used to render some shale inhibition or protection for the integrity of wellbore. Rev-Dust or calcium montmorillonite is added as a simulation for cuttings of actual drilling process. These unreactive fine clay particles will simulate an abrasiveness of drilling into subterranean formations and inner surfaces of casing and wellbore. And the finally added ingredient is the novel highly sulfurized lubricant and its counterparts.

Testing Method—Description and Conditions

Since CT drilling is linear drilling meaning the drill bits are thrusted forward into a well-bore in one linear dimension instead of the rotary mechanism of a conventional drilling, Draw-Bead tester were used to measure the friction reduction (% FR) or the effectiveness of a tested lubricant instead of Ofite meter which is conventionally used to measure % FR of lubricant in a drilling fluid, due to the fact that Ofite test is designed to measure rotary mechanism only. A steel trip coated with tested CT fluid which contains 1 wt. % of novel lubricant is sandwiched and drawn through a set of hardened-steel dies. The dies are heated to 200 F temperature The steel strip is cleaned and de-burred then is coated with the CT fluid to be tested. The coated strip is placed vertically in a vice and raised in between two dies. The dies apply 500 psi to the strip and the strip is drawn between the dies. As the strip is drawn, the force needed to pull the strip through the dies is plotted on the x-y plotter. Force is calculated from this plot. A total of two strips are run per sample. And percent's of friction reduction or % FR is calculated based on the difference in the pulling forces used for the tested fluid versus the standard fluid which can be a blank fluid containing no lubricant.

Testing Results and Discussion:

TABLE III

Friction Reduction As a Function of Sulfur Level in Coiled-Tubing Lubricant Compositions

| COILED-TUBING (CT) FLUIDS | % FRICTION REDUCTION |
|---|---|
| Blank CT Fluid, no lubricant | 0% |
| 1% Known Commercial CT Lubricant | 23% |
| 1% sulfurized (10% S) canola-based methyl esters (Lubricant I) | 40% |
| 1% sulfurized (15% S) canola-based methyl esters (Lubricant II) | 48% |
| 1% sulfurized (20% S) C-10 olefins (Lubricant III) | 40% |
| 1% sulfurized (38% S) C-10 olefins (Lubricant IV) | 55% |
| 1% sulfurized (20% S) C-16 olefins (Lubricant V) | 42% |
| 1% sulfurized (32% S) C-16 olefins (Lubricant VI) | 55% |

Blank coiled-tubing fluid contains no lubricant; its performance or required pulling hydraulic force was used as a standard. The fluid containing 1 wt. % of well-known commercial CT lubricant was added into the mix to see if its performance meaning established 20 to 25% friction reduction from the field could be illustrated by the Draw-Bead test; and it did quite well with 23% friction reduction (FR). We can see clearly that the FR is the function of the sulfur level in all sulfurized additives or lubricants; a higher sulfur level resulted in a greater friction reduction percent. And the increases in FR of the novel highly-sulfurized lubricants are about 70% to 140% of the commercial CT lubricants, more than sufficient for BHA of a coiled tubing apparatus to reach the entire length of a horizontal wellbore or lateral production zone.

In embodiments, the coiled-tubing fluid-lubricant-composition embodiments reduce the friction generated by steel sliding against steel surfaces by at least 40%. In embodiments, the coiled-tubing fluid-lubricant-composition embodiments reduce the friction generated by steel sliding against steel surfaces by at least 45%. In embodiments, the coiled-tubing fluid-lubricant-composition embodiments reduce the friction generated by steel sliding against steel surfaces by at least 50%.

Using the Coiled-Tubing-Lubricant Composition

The sulfur-containing coiled-tubing lubricant-composition embodiments can be used in the same manner that currently known coiled-tubing lubricants are used in coiled-tubing methods. The sulfur-containing coiled-tubing lubricant-composition embodiments can be introduced into a wellbore casing in the same manner that currently known coiled-tubing lubricants are introduced into a wellbore casing. When conducting coiled-tubing methods or operations, useful amounts of the sulfur-containing coiled-tubing lubricant-composition embodiments can be discovered by persons of ordinary skill in the art without having to exercise undue experimentation.

The invention claimed is:

1. A method for performing a coiled-tubing process, the method comprising the steps:

performing a coiled-tubing process using a fluid-lubricant composition that includes a sulfur-containing compound selected from the group consisting of sulfurized (10% S) canola-based methyl esters, sulfurized (15% S) canola-based methyl esters, sulfurized (22% S) C9 olefins, sulfurized (35% S) C9 olefins, sulfurized (20%) C10 olefins, sulfurized (38%) C10 olefins, sulfurized (18% S) C12 olefins, sulfurized (28% S) C12 olefins, sulfurized (16% S) C14 olefins, and sulfurized (25% S) C14 olefins; and introducing the fluid-lubricant composition into a subterranean wellbore casing.

2. The method of claim 1, wherein the fluid-lubricant composition also includes an emulsifier.

3. The method of claim 2, wherein the emulsifier is selected from the group consisting of a polyethylene glycol and a polyethylene glycol ester.

4. The method of claim 1, wherein the fluid-lubricant composition reduces the friction generated by steel sliding against steel surfaces by at least 40%.

* * * * *